Feb. 3, 1959 — C. E. TACK — 2,871,989
CLASP BRAKE LINKAGE ALIGNMENT ARRANGEMENT
Filed Aug. 19, 1955 — 2 Sheets-Sheet 1
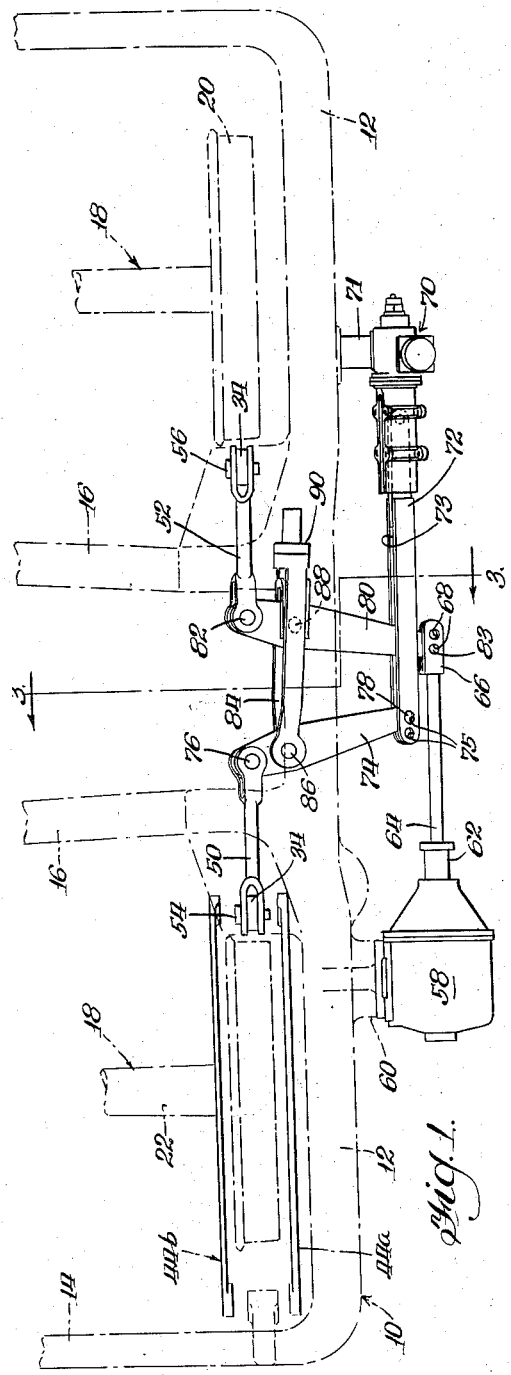
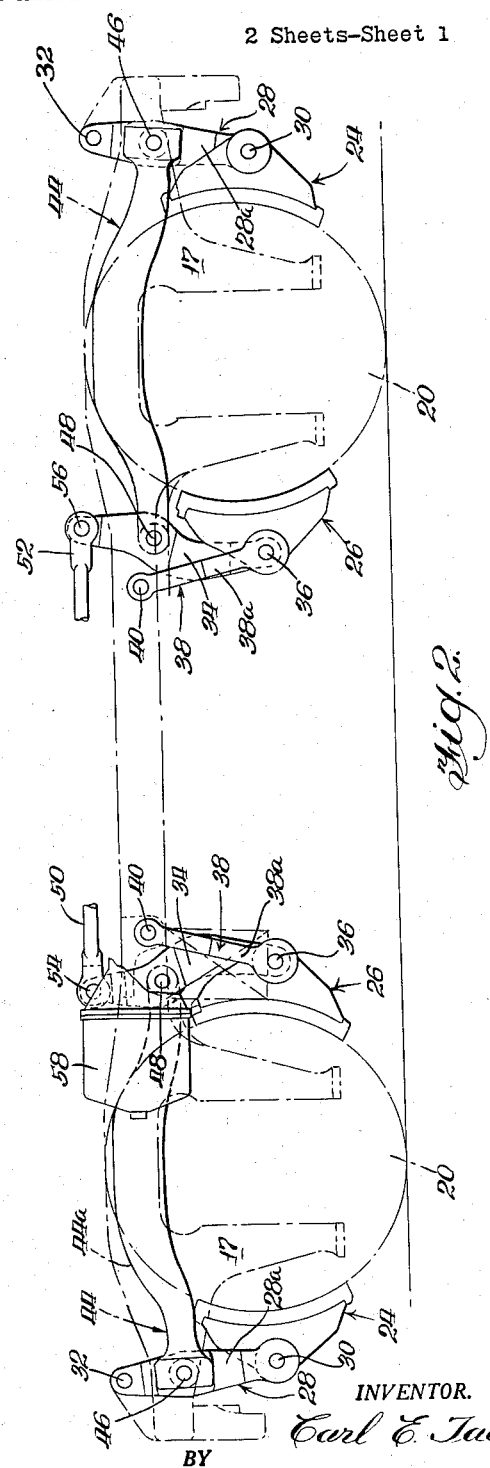
INVENTOR.
Carl E. Tack
BY Walter L. Schlegel, Jr. Atty.

Feb. 3, 1959 C. E. TACK 2,871,989
CLASP BRAKE LINKAGE ALIGNMENT ARRANGEMENT
Filed Aug. 19, 1955 2 Sheets-Sheet 2

INVENTOR.
Carl E. Tack
BY
Walter L. Schlegel, Atty.

United States Patent Office 2,871,989
Patented Feb. 3, 1959

2,871,989

CLASP BRAKE LINKAGE ALIGNMENT ARRANGEMENT

Carl E. Tack, Chicago, Ill., assignor to American Steel Foundries, Chicago, Ill., a corporation of New Jersey Application August 19, 1955, Serial No. 529,526

3 Claims. (Cl. 188—33)

This invention relates to brake rigging for railway car trucks and more particularly to an arrangement wherein the power means are mounted on the outboard sides of the truck frame.

One object of the invention is the provision of a clasp brake arrangement wherein the linkage interconnecting the brake levers and the frame mounted power cylinder and slack adjuster is compact and affords maximum clearance for other equipment associated with the truck.

Another object of the invention is to provide a novel linkage arrangement wherein the actuating levers are maintained in coplanar alignment with each other and interconnected by an adjustable link.

A more specific object of the invention is to provide a trapezoidal type linkage between the power cylinder, slack adjuster, and brake levers whereby the actuating levers are maintained in alignment with each other.

These and other objects of the invention will be apparent from an examination of the following description and drawings, wherein:

Figure 1 is a fragmentary plan view of a railway car truck embodying the invention, only one side of the truck being shown as the arrangement on the other side may be similar;

Figure 2 is a fragmentary side elevational view of the structure illustrated in Figure 1;

Figure 3:
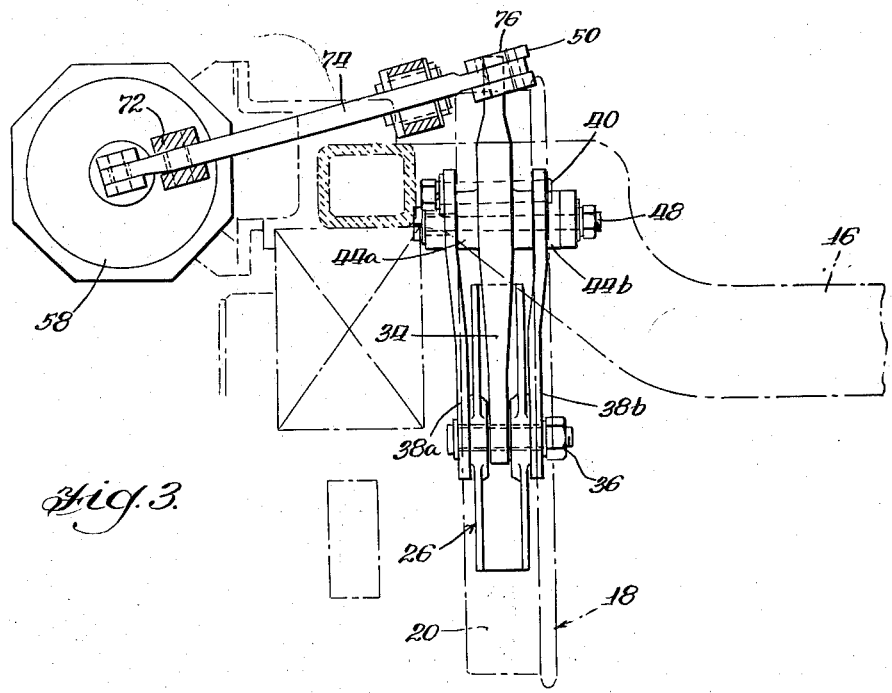
Figure 3 is an end elevational view of the structure illustrated in Figure 1 with portions of the structure shown in section taken along line 3—3 of Figure 1.

It will be understood that certain elements have been intentionally omitted from certain views where they are illustrated to better advantage in other views.

Describing the invention in detail and referring now to the drawings, it will be seen that the truck frame indicated generally at 10 of the illustrated embodiment comprises a pair of spaced side members 12 interconnected by end rails 14 and transoms 16.

The side members may be provided with pedestals 17 for conventionally mounting the journal boxes (not shown) of wheel and axle assemblies 18. Each wheel and axle assembly 18 comprises a wheel 20 rotatably secured to an axle 22.

Figure 4:
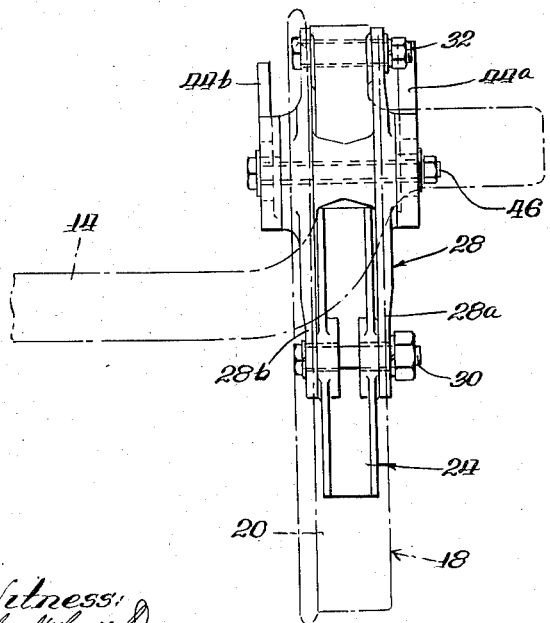
Figure 4 is an end elevational view of the structure shown in Figure 2 as seen from the left.

In the embodiment illustrated, outer and inner brake shoe assemblies 24 and 26, respectively, are positioned adjacent each wheel 20 for engagement therewith. As best seen in Figure 4, each outer brake shoe assembly 24 is pivotally connected to the lower end of outer brake lever 28 by pin 30. The outer brake levers 28 are preferably double brake levers having outboard and inboard elements 28a and 28b, respectively, which serve to maintain the brake shoe assembly in alignment with the related wheel. The upper end of each outer brake lever 28 is pivoted to the frame by pin 32. Each inner brake shoe assembly 26 is pivotally connected to the lower end of inner single brake lever 34 by pin 36.

Each inner brake shoe assembly 26 may be additionally supported from the side member by a double brake hanger 38 comprising outboard and inboard elements 38a and 38b, respectively, which is pivoted at its lower end to the shoe at 36 and at its upper end to the side member at 40.

The inner and outer brake levers are preferably interconnected intermediate their respective ends by a double strap 44 having outboard and inboard elements 44a and 44b, respectively, which are pivoted to the outer lever by pin 46 and to the inner lever by pin 48.

The upper ends of the left and right inner brake shoe levers 34 (as seen in Figure 2) may be pivotally connected to links 50 and 52, respectively, by pins 54 and 56.

The power for actuation of the brake levers in the preferred embodiment illustrated is provided by a power cylinder 58 rigidly mounted to the outboard side of the side member by means of bracket 60 and preferably positioned adjacent one of the wheels 20 and its related inner brake lever. The power cylinder may be provided with a conventional piston 62 having a piston rod 64 which extends longitudinally of the truck in the direction of the other wheel 20. The outer end of the piston rod 64 is preferably provided with a bifurcated element 66 having a plurality of co-aligned apertures 68.

A conventional automatic slack adjusting device 70 is preferably mounted to the outboard side of the side member by means of bracket 71 and positioned adjacent the other wheel 20 and its related inner brake lever in substantial longitudinal alignment with the power cylinder. The slack adjusting device includes an extension bar element 72 which is preferably bifurcated to form a slot 73 and which has a plurality of co-aligned apertures 75. It will be noted that the piston rod and extension bar elements of the power cylinder and slack adjusting device, respectively, extend toward and beyond each other across the transverse center line of the truck.

Inner brake lever links 50 and 52, respectively, may be connected to the slack adjusting extension bar element and power cylinder piston rod element, respectively, by live actuating levers 74 and 80. Actuating lever 74 has its inner extremity pivoted to link 50 at 76 and its outer extremity pivoted to the slack adjusting extension bar element 72 at 78 extending through co-aligned apertures 75 of the extension bar element.

Actuating lever 80 has its inner extremity pivoted to link 52 at 82 and its outer extremity pivoted to piston rod element 66 at 83. It will be noted that the right hand actuating lever 80, as seen in Figure 1, is disposed to extend through the slot 73 of the slack adjusting extension bar element 72. Thus the actuating levers are assured of being maintained in coplanar alignment with each other.

Actuating levers 74 and 80 are preferably interconnected intermediate their respective ends by a pull rod or link 84 pivotally connected to actuating lever 74 by pin 86 and to actuating lever 80 by pin 88. The pull rod or link 84 may be provided with a conventional screw type adjusting mechanism 90 to adjust the distance between the respective levers.

To describe the operation of the arrangement, referring again to Figure 1, it will be seen that as the power cylinder is actuated, the piston rod is urged to the right, carrying with it the outer extremity of the right hand actuating lever 80 which pivots counterclockwise about pin 88. The inner extremity of the lever 80 moves to the left carrying with it the link 52 and the upper extremity of inner right hand brake lever 34. As its upper end moves to the left, the inner brake lever pivots counterclockwise about point 48, and the right hand inner brake shoe assembly 26, a seen in Figure 2, engages right hand wheel 20. The pivot point of the inner brake lever then shifts from pin 48 to pin 36 and the brake lever continues to rotate counterclockwise, carrying the right hand strap 44 to the left. As the strap 44 moves to the left, as seen in Figure 2, it causes right hand outer brake lever 28 to pivot clockwise about pin 32 and carry the right hand outer brake shoe assembly 24 into engagement with the wheel.

As the brake shoe engages the wheel, the motion of the piston rod continues to the right, urging the actuating lever further in a counterclockwise direction, and the pivot point of the right hand actuating lever shifts from pin 88 to pin 82 and the pull rod 84 is moved to the right, as seen in Figure 1. The left hand actuating lever 74, being fulcrumed at its outer end to the slack adjusting extension bar element at 78, rotates in a clockwise direction with its inner extremity carrying link 50 to the right. As link 50 moves to the right, it causes the left hand inner brake lever 34, as seen in Figure 2, to rotate clockwise about pin 48 and carry the left hand inner brake shoe assembly 26 into engagement with the wheel. The pivot point of the inner brake lever then shifts to pin 36 and the brake lever continues to rotate clockwise carrying the strap 44 to the right causing outer lever 28 to rotate counterclockwise about pin 32 and carry left hand outer brake shoe assembly 24 into engagement with the wheel.

It will be understood that in actual operation the movements of the various parts take place at substantially the same time.

By means of the novel trapezoidal linkage arrangement between the actuating levers, power cylinder, and slack adjusting device, the arrangement is made compact and self-aligning, thus affording maximum clearance on the truck where other elements associated therewith are not a part of the actual braking mechanism.

I claim:

1. In a self-aligning trapezoidal tread brake linkage arrangement for a railway car truck, including a frame and a pair of supporting wheel and axle assemblies, the combination of: a pair of brake shoe assemblies disposed between respective assemblies for engagement therewith; a pair of generally vertically extending dead brake levers fulcrumed intermediate their ends to the frame and pivotally connected at their lower ends to respective brake shoe assemblies; a pair of floating links having corresponding outer ends connected to the upper ends of respective brake levers; a power cylinder member and an automatic slack adjuster member mounted on the outboard side of the frame adjacent respective assemblies, said cylinder member having a piston rod element extending toward the slack adjuster member, said slack adjuster member having an extension element extending toward said power cylinder member, said elements having ends extending beyond each other, said slack adjuster member element comprising a pair of spaced bars defining a slot therebetween; a pair of live and dead actuating levers having their inboard ends connected to corresponding inner ends of the respective links, said dead actuating lever being disposed between the power cylinder member and the live actuating lever and having its outboard end pivotally connected to the end of slack adjuster member element, said live actuating lever being disposed between the slack adjuster member and the dead actuating lever and having its outboard end disposed within the slot of said slack adjuster member element and pivotally connected to the end of said power cylinder member element; and a manually adjustable floating connector disposed to extend in a direction generally parallel to the elements of said members and comprising a pair of spaced bars interconnecting medial portions of the respective actuating levers and presenting therebetween a slot in which is disposed said live actuating lever.

2. In a self-aligning trapezoidal brake linkage arrangement for a railway car truck having a frame and a pair of supporting wheel and axle assemblies, the combination of: brake means engageable with respective assemblies; a pair of levers extending in generally parallel directions and disposed for rotational movement in a common plane, said levers having corresponding inboard ends connected to respective brake means; power cylinder and slack adjuster members mounted on the frame outboardly adjacent the respective levers and having extension elements with ends extending longitudinally of the frame toward and beyond each other, one of said extension elements comprising a pair of spaced bars defining a slot therebetween; and a floating link extending in a direction generally parallel to said elements and comprising a pair of spaced bars interconnecting medial portions of said levers and defining a slot therebetween; one of said levers being disposed between one of said members and the other lever and having its outboard end connected to the end of the element of the other member, the other of said levers being disposed between said one lever and said other member and having its outboard end connected to the end of the element of said one member, said one lever being disposed to extend through the slots presented by said link and said one element.

3. A self-aligning trapezoidal brake linkage arrangement according to claim 2, and including manually adjustable means associated with said link operable to regulate the distance between said levers.

References Cited in the file of this patent

UNITED STATES PATENTS

| 1,283,760 | Hedgecock | Nov. 5, 1918 |
| 1,998,976 | Baselt | Apr. 23, 1935 |
| 2,055,959 | Baselt | Sept. 29, 1936 |
| 2,494,280 | Baselt | Jan. 10, 1950 |
| 2,657,766 | Wine | Nov. 3, 1953 |